United States Patent [19]
Ghidotti

[11] Patent Number: 6,147,324
[45] Date of Patent: Nov. 14, 2000

[54] SIMPLIFIED COMMAND AND CONTROL DEVICE FOR A COUPLING-WELDING MACHINE FOR METAL PIPES IN WHICH THE MACHINE IS INSERTED

[75] Inventor: Luigi Ghidotti, Arcene, Italy

[73] Assignee: PSI Pipeline Service, Switzerland

[21] Appl. No.: 09/117,130

[22] PCT Filed: Dec. 10, 1997

[86] PCT No.: PCT/EP97/06885

§ 371 Date: Jul. 22, 1998

§ 102(e) Date: Jul. 22, 1998

[87] PCT Pub. No.: WO98/30353

PCT Pub. Date: Jul. 16, 1998

[30] Foreign Application Priority Data

Jan. 10, 1997 [IT] Italy ................................ MI97A0038

[51] Int. Cl.[7] .............................. B23K 9/12; B23K 9/00; B23K 9/10
[52] U.S. Cl. ..................... 219/125.11; 219/132; 219/59.1
[58] Field of Search .............................. 219/125.11, 59.1, 219/132

[56] References Cited

U.S. PATENT DOCUMENTS

| | | | |
|---|---|---|---|
| 5,148,000 | 9/1992 | Tews | 219/125.11 |
| 5,276,305 | 1/1994 | Hsien | 19/132 |
| 5,433,484 | 7/1995 | Ewen et al. | 285/21 |
| 5,529,656 | 6/1996 | Ewen et al. | 156/273.9 |

*Primary Examiner*—Patrick Ryan
*Assistant Examiner*—Anjan Dey
*Attorney, Agent, or Firm*—Steinberg & Raskin, P.C.

[57] ABSTRACT

A command and control device (1) for a coupling-welding machine (2) for metal pipes (3, 4) within which said machine is positioned, said machine (2) being movable within the pipe by drive means (5) and provided with welding means (6) for joining different pieces (3, 4) of said pipe together, the operation of said welding means (6) and drive means (5) being controlled by control means (12) associated with the machine (2) and connected to commanding means (9) external to the pipe. The operation of the machine (2) is controlled by a single microprocessor unit associated with the control means (12).

11 Claims, 2 Drawing Sheets

SIMPLIFIED COMMAND AND CONTROL DEVICE FOR A COUPLING-WELDING MACHINE FOR METAL PIPES IN WHICH THE MACHINE IS INSERTED

The present invention relates to a command and control device for a coupling-welding machine for metal pipes.

A coupling-welding machine for metal pipes (or coupling machine for brevity) is known to comprise a device which enables the movement of the machine to be commanded and controlled within the pipe, and the welding heads carried by said machine to be activated. The device comprises a remote commanding unit external to the pipe in which the machine is located, and connected to a control unit associated with the machine to control the execution of the numerous operations which the machine performs. These operations comprise: moving the coupling machine within the pipe, aligning the machine with one end of the pipe, clamping appropriate known parts of the machine to the end of that pipe and to a pipe brought close to that end, positioning the welding heads in predefined positions within the pipes to weld them together, powering at least one welding cable, and providing the necessary shielding for the gas generated during said welding. All these operations must be constantly monitored to ensure that they are properly carried out. This is done by the control unit associated with the coupling machine, said unit being controlled by an operator via the remote commanding unit external to the pipe. This latter unit carries a plurality of analog or digital light-emitting display devices positioned on an interface on which there are also provided keys, levers or similar command members by which an operator can control and suitably intervene in the operation of the coupling machine.

Usually the commanding unit and control unit comprise variously configured electrical circuits to enable an operator to actuate and control the welding machine (via the display devices or the like)

U.S. Pat. No. 5,148,000 describes a device for controlling a coupling machine, of the type comprising a commanding unit and control unit of multiprocessor type in which these units are connected together by a serial connection (or at least two cables enclosed in a single sheath) With this solution an external microprocessor holds in its memory all the machine operating steps (program). Other microprocessors are associated with the machine, these also containing said operating steps in their memory. This control system, defined as distributed processing, enables fast and reliable control of the welding machine to be achieved.

This device is also of simpler construction than the aforesaid electrical circuit types, is more reliable then these latter, and is of considerably lower cost than these. Its cost is however still relatively high (because of the large number of components), it is of very complex construction, and is very sensitive to low temperature (at which the welding machine has often to operate) in relation to the connecting cable between the multiprocessor control unit and the commanding unit, also of multiprocessor type. In this respect, if this cable is bent, it can easily break because of its fragility caused by said temperature. In addition, this solution is of poor reliability precisely because of the large number of components.

An object of the invention is to provide an improved command and control device for a metal pipe coupling machine.

A particular object of the invention is to provide a device of the stated type having a small number of components and hence simpler and of lower cost than the known solutions, and which is more reliable in use than these latter.

These and further objects are attained by a device in accordance with the accompanying claims.

The present invention will be more apparent from the accompanying drawing, which is provided by way of non-limiting example and on which:

Figure 1:
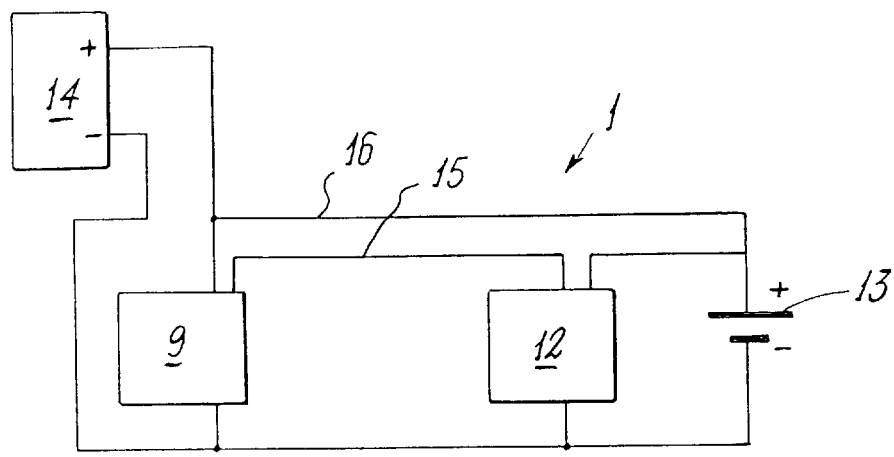
FIG. 1 is a general block diagram of the device of the invention.

With reference to said figures, the device of the invention is indicated overall by the reference numeral 1 and is associated with a coupling machine 2 for metal pipes 3 and 4. The machine is moved within these pipes by drive means 5 and is provided with welding means 6 for joining together two metal pipes which have been previously brought into contact. The machine 2 is known per se and will not be further described.

The operative functions of the machine 2 are actuated and controlled by the device 1. In known manner, it comprises a commanding unit 9 for actuating (by an operator) the operative functions of the machine 2. The unit 9 is always external to the pipe within which the coupling machine 2 moves, so as to be able to be used by an operator.

The machine 2 also supports a control unit 12 which directly and independently superintends the operation of the various operating parts of the machine 2 in accordance with well defined operating steps. This unit is of microprocessor type and, according to the invention, is the only command and control unit associated with the coupling-welding machine (so as to define a central processing device).

Finally, in known manner the machine 2 carries a battery 13 allowing the usual electrical or electropneumatic members (valves, motors, welders, etc.) associated with the coupling machine to be independently powered electrically. The battery 13 is removably connected to an electrical feed or battery charging circuit 14 external to the machine 2 via a supply cable 16. This cable is also connected to the units 9 and 12, for powering them.

In order for the coupling machine to operate, the unit 9 and the unit 12 must be connected together, so that data can be exchanged between them. More specifically, the unit 9 must be able to inform the unit 12 of the state of pushbuttons, selectors and switches present on its interface so that the control unit 12 is able to execute the operator's commands. Furthermore, the commanding unit 9 must be able to receive from the unit 12 data to be displayed on appropriate displays present on said interface (generally three in number) to keep the operator informed of the machine operation.

This connection is made via a dedicated single-core cable 15 and via the power cable 16 which connects the battery charger 14 to the battery 13. This latter has the characteristic of being bendable while at the same time withstanding this bending at low temperature (of −50° C. and beyond) without breaking, and is already provided on every coupling machine.

Specifically, the cable 16 comprises one core for the positive signal, one for the negative and one earth core. One of these cores, preferably the negative, is used as the return wire for the data transmission signal between the unit 12 and the unit 9. To enable the cable 16 to be used for communication between said units, data transmission (of serial type) is preferably by high-frequency modulated signals, for example exceeding 100 kHz, and preferably between 180 and 250 kHz. This is to prevent the voltage drop along the power cable 16 changing the logic level of the signals exchanged between the units 9 and 12 and hence prevent faulty control and command of the welding machine 2.

Finally, advantageously each transmission signal has zero mean value to prevent it discharging across the battery and the battery charger.

Figure 2:
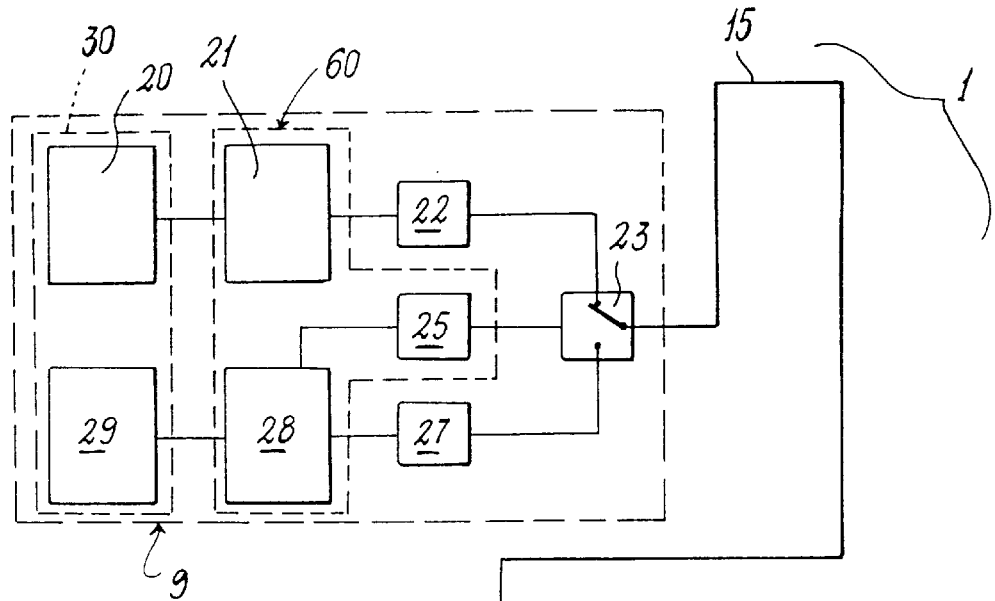
FIG. 2 is a detailed block diagram of the device of FIG. 1.
Figure 2:
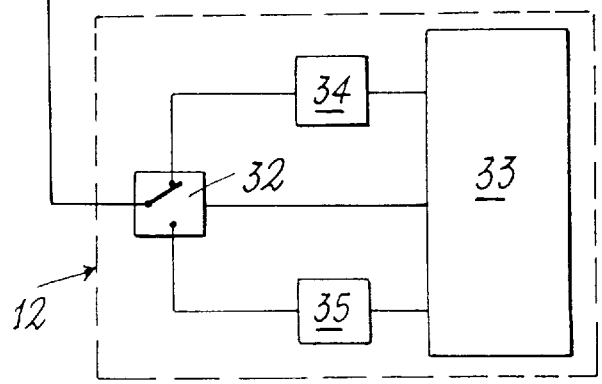
Figure 3:
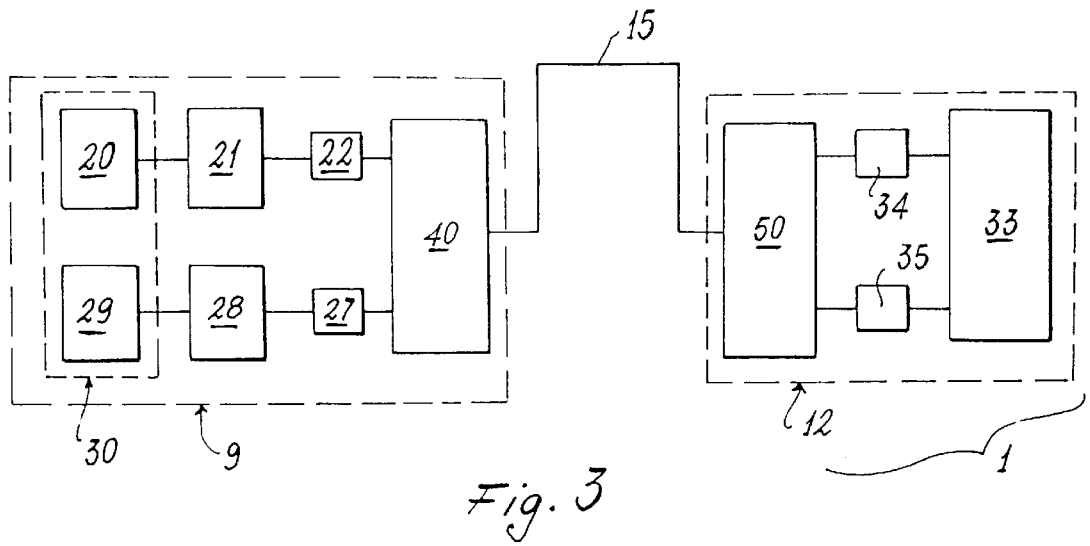
FIG. 3 is a detailed block diagram of a modification of the device of FIG. 1.
Figure 4:
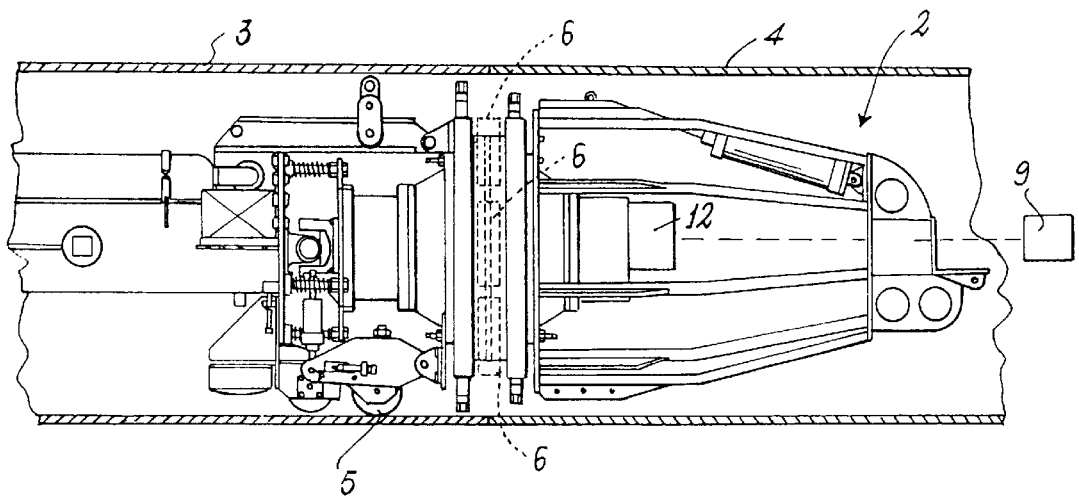
FIG. 4 is a schematic view of a coupling machine provided with the device of the invention.

With this method of data transmission, the unit 9 and the unit 12 preferably have the configurations of FIGS. 2 and 3 (which for simplicity do not show the power cable 16 connected to these units). In FIG. 2, the device 1 is of the type in which the connection between the units 9 and 12 is bidirectional of alternate single direction (ie half duplex), whereas in the device 1 of FIG. 3 these units are connected together bidirectionally for simultaneous double direction transmission (ie full duplex).

More specifically, with reference to FIG. 2 (showing a half duplex connection), the commanding unit 9 comprises a command block 20 connected to a parallel-serial converter 21. It is able to convert the state of the components (pushbuttons, 2-way switches, etc.) of the block 20 into a train of digital pulses, advantageously encoded, said state being monitored periodically (eg. every 40 msec.). The converter 21 is connected to a modulator 22 which, on the basis of the pulse train leaving said converter, generates an amplitude-modulated square wave carrier of high frequency (eg. 200 kHz). The modulator hence generates the output signal (in voltage) which, on the basis of the position of a static switch 23, is fed along the dedicated cable 15. The switch 23 is actuated by a driver member 25 itself controlled by encoded signals originating from the microprocessor control unit 12, which decides the direction of the connection, ie towards the unit 9 if the unit has to feed its data to it, or vice versa if it has to receive data. The member 25 is therefore substantially a passive member which receives commands from the unit 12, and acts on the switch 23 only on the basis of these.

This latter is then connected in series with a demodulator 27, a serial/parallel converter 28 and a display block 29. This block and the said block 20 form part of the said interface (now indicated by 30). The demodulator 27, the converter 28 and the block 29 are arranged to receive, demodulate, convert and display the signals originating from the unit 12 along the dedicated cable 15.

Preferably the member 25, the converter 21 and the converter 28 are combined into a single data transmission handling unit 60 which is totally passive and under the control of the-control unit 12.

The converter 28 is connected to the member 25 to enable this member to accept the signals from the control unit 12.

This latter is connected to the dedicated cable 15 via a directing or 2-way switch 32 which determines (in a manner similar to 23) the direction of signal transmission along the cable 15. The switch 32 is driven by a microprocessor circuit 33 which controls all the functions of the machine 2. It generates the pulse train (amplitude modulated, with high frequency carrier, by a modulator 34) transmitted towards the unit 9 and decodes the pulse train (demodulated by a demodulator 35) received from the commanding unit. The circuit 33 determines the direction of the data flow along the dedicated cable 15 by operating on the switch 32 connected to the modulator 34 and demodulator 35.

The operation of the device 1 is clear from the description of FIG. 2 and will therefore not be further described.

In FIG. 3, in which parts corresponding to those of FIG. 2 are indicated by the same reference numerals, the device 1 is shown in the full duplex configuration. In this case, in contrast to the device of FIG. 2, the signal of one direction (transmitted) must be distinguished from the signal of the other direction (received) by modulating, for example, the two signals with two different sinusoidal carriers with conveniently separated frequencies. This is achieved by providing within each unit 9 and 12 a suitable filtering member (40 and 50 respectively) to replace the corresponding 2-way switch 23 and 32 (and the member 25).

The operation of the device 1 of FIG. 3 is similar to that of the device of FIG. 2. In this case the signals emitted by the unit 9 modulated by a suitable carrier are fed to the unit 12 via the member 40. In known manner this latter clips the signals fed to the demodulator 21 and consequently nothing happens in the block 29. The signals directed along the cable 16 towards the unit 12 are received by the filtering member 50 which in known manner feeds them to the demodulator 35 and hence to the microprocessor circuit 33. The member 50 prevents these signals reaching the modulator 34 (by nullifying them).

The opposite occurs in the case of the signal fed by the unit 12 to the unit 9. When both signals (that transmitted by the unit 9 to the unit 12 and that received from the unit 12) are present along the cable 15, the filtering members 40 and 50 suitably direct the signals towards the corresponding demodulators 35 or 27 to prevent signal superimposing.

The device of the invention is simpler than known devices. Moreover, the use of a single dedicated communication cable for connecting the single microprocessor control unit (controlling the machine operation) to the remote commanding unit (the return signal being fed along the battery charger powering cable) makes the device more reliable, lighter and less bulky than known devices.

Two embodiments of the invention have been described. Others are however possible in the light of the present description. These other embodiments are to be considered as falling within the scope of the present document.

What is claimed is:

1. A command and control device for a coupling-welding machine (2) for metal pipes (3, 4) within which said machine is positioned, said machine (2) being movable within the pipe and provided with welding means (6) for joining different pieces (3, 4) of said pipe together, and comprising drive means (5) enabling it to move independently within the pipe, the operation of said welding means (6) and drive means (5) being controlled by control means (12) associated with the machine (2), said control means (12) being connected to commanding means (9) which are external to the pipe and which actuate the operation of the welding means (6) and drive means (5), the machine (2) being provided with an energy source (13) which can be powered from the exterior of the pipe by charging means (14) connected to said source (13) via a corresponding power line (16), said device being characterised by comprising only a single microprocessor unit for controlling and actuating the operation of the coupling-welding machine (2).

2. A device as claimed in claim 1, characterised in that the single microprocessor unit is associated with the control means (12) associated with the coupling-welding machine (2).

3. A device as claimed in claim 1, characterised in that the control means (12) are connected to the commanding means (9) via a single dedicated communication line (15) along which the signals generated by said means are transmitted, return signals from said transmission between said means being fed along the power line (16) connecting the battery (13) to its charging means (14).

4. A device as claimed in claim 2, characterised in that the signals transmitted between the commanding means (9) and control means (12) are frequency-modulated signals.

5. A device as claimed in claim 4, characterised in that the signals transmitted between the commanding means (9) and control means (12) are of high frequency.

6. A device as claimed in claim 1, characterised in that the signals transmitted between the commanding means (9) and the control means (12) have zero mean value.

7. A device as claimed in claim 1, characterised in that the signals transmitted between the commanding means (9) and the control means (12) are digital signals.

8. A device as claimed in claim 1, characterised in that signal transmission between the commanding means (9) and the control means (12) is bidirectional of alternate single direction or half duplex.

9. A device as claimed in claim 1, characterised in that signal transmission between the commanding means (9) and the control means (12) is bidirectional with simultaneous double direction or full duplex.

10. A device as claimed in claim 1, characterised in that the commanding means (9) comprise converting means for converting a state of components of the block (20) into a train of digital pulses and for feeding signals to the control means (12), and an arrangement of components comprising a demodulator (27), a convertor (28) and a display block (28), which acts as means for receiving signals from said control means (12), said feeding and receiving means being connected to switching means (23) which connect them alternately to the dedicated communication line (15), said switching means (23) being controlled and driven by the control means (12).

11. A device as claimed in claim 1, characterised in that the commanding means (9) and control means (12) comprise filtering means (40, 50) to enable full duplex transmission.

* * * * *

UNITED STATES PATENT AND TRADEMARK OFFICE
CERTIFICATE OF CORRECTION

PATENT NO. : 6,147,324 Page 1 of 1
DATED : November 14, 2000
INVENTOR(S) : Luigi Ghidotti It is certified that error appears in the above-identified patent and that said Letters Patent is hereby corrected as shown below:

<u>Title page,</u>
Item [73], Assignee: should read -- PSI Pipeline Service S.A. --

Signed and Sealed this

Second Day of July, 2002

*Attest:*

*Attesting Officer*

JAMES E. ROGAN
*Director of the United States Patent and Trademark Office*